(12) United States Patent
Guo et al.

(10) Patent No.: US 12,136,852 B2
(45) Date of Patent: Nov. 5, 2024

(54) ELECTROMOTOR AND LAUNDRY MACHINE

(71) Applicants: FOSHAN WELLING WASHER MOTOR MANUFACTURING CO., LTD., Guangdong (CN); HUAI'AN WELLING MOTOR MANUFACTURING CO., LTD., Jiangsu (CN)

(72) Inventors: Bingchun Guo, Guangdong (CN); Xiaogang Zhu, Guangdong (CN); Minghu Yu, Guangdong (CN)

(73) Assignees: FOSHAN WELLING WASHER MOTOR MANUFACTURING CO., LTD., Guangdong (CN); HUAI'AN WELLING MOTOR MANUFACTURING CO., LTD., Jiangsu (CN)

( * ) Notice: Subject to any disclaimer, the term of this patent is extended or adjusted under 35 U.S.C. 154(b) by 486 days.

(21) Appl. No.: 17/682,519

(22) Filed: Feb. 28, 2022

(65) Prior Publication Data

US 2022/0181924 A1  Jun. 9, 2022

Related U.S. Application Data

(63) Continuation of application No. PCT/CN2020/137628, filed on Dec. 18, 2020.

(30) Foreign Application Priority Data

Sep. 15, 2020  (CN) .......................... 202010968683.5

(51) Int. Cl.
 *H02K 1/18* (2006.01)
 *D06F 37/20* (2006.01)

(52) U.S. Cl.
 CPC ........... *H02K 1/185* (2013.01); *D06F 37/206* (2013.01)

(58) Field of Classification Search
 CPC ..................................................... H02K 1/185
 See application file for complete search history.

(56) References Cited

U.S. PATENT DOCUMENTS

| 4,668,898 | A | 5/1987 | Harms et al. |
| 6,037,726 | A | 3/2000 | Tabata et al. |

(Continued)

FOREIGN PATENT DOCUMENTS

| CN | 101461294 A | 6/2009 |
| CN | 201343660 Y | 11/2009 |

(Continued)

OTHER PUBLICATIONS

First Office Action dated Nov. 24, 2022 received in Chinese Patent Application No. CN 202111453050.1.

(Continued)

*Primary Examiner* — Jason Y Ko
(74) *Attorney, Agent, or Firm* — Scully, Scott, Murphy & Presser, P.C.

(57) ABSTRACT

An electromotor and a laundry machine are provided. The electromotor has a controller and a controller cover. The controller is arranged on the controller cover. A first end cover and a second end cover of the electromotor are fixedly arranged on two opposite sides of a stator respectively. The controller cover is provided with a first mounting part and a second mounting part secured with a water container. The first end cover or the stator is provided with a third mounting part secured with the first mounting part. The third mounting part is arranged on the first end cover or the stator. The laundry machine has the electromotor.

15 Claims, 5 Drawing Sheets

(56) References Cited

U.S. PATENT DOCUMENTS

| | | |
|---|---|---|
| 2003/0107279 A1 | 6/2003 | Yang |
| 2009/0096305 A1 | 4/2009 | Marioni |
| 2010/0019629 A1 | 1/2010 | Amaya et al. |
| 2012/0096902 A1 | 4/2012 | Major et al. |
| 2014/0091672 A1 | 4/2014 | Yamada et al. |
| 2016/0056681 A1 | 2/2016 | Major et al. |

FOREIGN PATENT DOCUMENTS

| | | |
|---|---|---|
| CN | 102801253 A | 11/2012 |
| CN | 102904354 A | 1/2013 |
| CN | 202721533 U | 2/2013 |
| CN | 103229394 A | 7/2013 |
| CN | 103580356 A | 2/2014 |
| CN | 103748768 A | 4/2014 |
| CN | 203660711 U | 6/2014 |
| CN | 203883586 U | 10/2014 |
| CN | 104158333 A | 11/2014 |
| CN | 203933222 U | 11/2014 |
| CN | 104682607 A | 6/2015 |
| CN | 204733005 U | 10/2015 |
| CN | 105048705 A | 11/2015 |
| CN | 204794453 U | 11/2015 |
| CN | 204794462 U | 11/2015 |
| CN | 205039640 U | 2/2016 |
| CN | 105386278 A | 3/2016 |
| CN | 105391224 A | 3/2016 |
| CN | 105463774 A | 4/2016 |
| CN | 106253572 A | 12/2016 |
| CN | 104158333 B | 11/2017 |
| CN | 107313948 A | 11/2017 |
| CN | 107404174 A | 11/2017 |
| CN | 206962600 U | 2/2018 |
| CN | 108134464 A | 6/2018 |
| CN | 108551223 A | 9/2018 |
| CN | 208489737 U | 2/2019 |
| CN | 208608816 U | 3/2019 |
| CN | 109962541 A | 7/2019 |
| CN | 209233673 U | 8/2019 |
| CN | 110768474 A | 2/2020 |
| CN | 210273657 U | 4/2020 |
| CN | 212343506 U | 1/2021 |
| CN | 212751976 U | 3/2021 |
| CN | 212935583 U | 4/2021 |
| DE | 608371 C | 1/1935 |
| DE | 102010062824 A1 | 6/2012 |
| EP | 0610570 A1 | 8/1994 |
| EP | 1109292 A2 | 6/2001 |
| EP | 1843453 A1 | 10/2007 |
| FR | 2155181 A5 | 5/1973 |
| GB | 2305023 A | 3/1997 |
| JP | S60202116 A | 10/1985 |
| JP | H01321848 A | 12/1989 |
| JP | H07212993 A | 8/1995 |
| JP | H08266001 A | 10/1996 |
| JP | 2001251806 A | 9/2001 |
| JP | 2005304213 A | 10/2005 |
| JP | 2006211835 A | 8/2006 |
| JP | 2007306751 A | 11/2007 |
| JP | 2020054628 A | 4/2020 |
| KR | 20130063212 A | 6/2013 |

OTHER PUBLICATIONS

Second Office Action dated May 17, 2023 received in Chinese Patent Application No. CN 202111453050.1.

First Office Action dated Dec. 7, 2022 received in Chinese Patent Application No. CN 202111454864.7.

Extended European Search Report dated Oct. 31, 2022 received in European Patent Application No. EP 20950480.2.

Second Office Action dated May 17, 2023 received in Chinese Patent Application No. CN 202111453051.1.

Notice of Reasons for Refusal dated Apr. 25, 2023 received in Japanese Patent Application No. JP 2022-513595.

First Office Action dated Nov. 24, 2022 received in Chinese Patent Application No. CN 202111453051.1.

International Search Report dated Jun. 16, 2021 received in International Application No. PCT/CN2020/137628.

Second Office Action dated Mar. 19, 2023 received in Chinese Patent Application No. CN 202111454864.7.

Request for the Submission of an Opinion dated Sep. 12, 2023 received in Korean Patent Application No. KR 10-2022-7006870.

Notice of Final Rejection dated Nov. 20, 2023 received in Korean Patent Application No. KR 10-2022-7006870.

Request for the Submission of an Opinion dated Nov. 30, 2023 received in Korean Patent Application No. KR 10-2022-7006919.

Notice of Reasons for Refusal dated Apr. 25, 2023 received in Japanese Patent Application No. JP 2022-513594.

Notice of Reasons for Refusal dated Oct. 3, 2023 received in Japanese Patent Application No. JP 2022-513594.

Extended European Search Report dated Nov. 4, 2022 received in European Patent Application No. EP 20950481.0.

First Office Action dated Nov. 23, 2022 received in Chinese Patent Application No. CN 202010969965.7.

Second Office Action dated Mar. 11, 2023 received in Chinese Patent Application No. CN 202010969965.7.

Decision of Rejection dated Apr. 29, 2023 received in Chinese Patent Application No. CN 202010969965.7.

Third Office Action dated Sep. 18, 2023 received in Chinese Patent Application No. CN 202111453050.1.

Notification to Grant Patent Right for Invention dated Oct. 18, 2023 received in Chinese Patent Application No. CN 202111454864.7.

International Search report dated Jun. 16, 2023 received in International Application No. PCT/CN2020/137616.

ELECTROMOTOR AND LAUNDRY MACHINE

CROSS-REFERENCE TO RELATED APPLICATIONS

This application is a continuation application of PCT International Application No. PCT/CN2020/137628, filed on Dec. 18, 2020, which claims priority to and benefits of Chinese Patent Application No. 202010968683.5, filed on Sep. 15, 2020, the entire contents of which are incorporated herein by reference for all purposes. No new matter has been introduced.

FIELD

The present disclosure relates to the technical field of household appliances, and particularly relates to an electromotor and a laundry machine.

BACKGROUND

The invention of laundry machine liberates people's hands, and laundry machine becomes an essential electric appliance in people's daily life. A controller arranged inside the laundry machine controls an electromotor to rotate so as to simulate a washing action. At present, a structure that integrates the electromotor with the controller is used in some laundry machines, the controller is arranged on the electromotor. Moreover, since the electromotor needs to be arranged on an external structure (such as, a water container of the laundry machine), a housing of the electromotor needs to be provided with a mounting structure arranged to be secured with the water container. Thus, complex structures of end covers of the electromotor are caused, a range of selection of materials is restrained, and a high cost of the electromotor is resulted.

SUMMARY

An objective of the embodiments of the present disclosure is providing an electromotor and a laundry machine, which aims at solving at least the problem that the housing of the electromotor is provided with a structure fixedly connected with the water container, so that complex structures of the end covers of the electromotor are caused.

In order to solve at least the technical problem discussed above, the technical solutions used in the embodiments of the present disclosure are as follows:

in the first aspect, an electromotor is provided, the electromotor includes a controller and a controller cover, where the controller is arranged on the controller cover; the electromotor further includes a first end cover and a second end cover secured with the first end cover; the electromotor further includes a stator, the first end cover and the second end cover are fixed on two opposite sides of the stator respectively; the controller cover is provided with a first mounting part configured to be secured with the first end cover and is provided with a second mounting part configured to be secured with a water container of a laundry machine, and the first end cover is provided with a third mounting part configured to be secured with the first mounting part; or alternatively the controller cover is provided with the first mounting part configured to be secured with the stator, and is provided with the second mounting part configured to be secured with the water container of the laundry machine, and the stator is provided with the third mounting part configured to be secured with the first mounting part.

In one embodiment, the second mounting part is arranged on one side of the controller cover opposite to the controller.

In one embodiment, a surface of the controller cover protrudes outwards to form a mounting foot, the second mounting part is arranged on the mounting foot, where the second mounting part is a mounting hole or a mounting column.

In one embodiment, a surface of the controller cover is provided with heat dissipation fins.

In one embodiment, the controller cover is the one selected from a group consisting of an aluminum cover, a cover made of aluminum alloy and a resin cover.

In one embodiment, the first mounting part and the third mounting part are connected by a first fixing member, and the first fixing member is arranged to pass through the first mounting part and the third mounting part.

In one embodiment, one side of the first end cover, which faces the controller cover, is provided with a first positioning element, and the controller cover is provided with a second positioning element that comes into engagement with the first positioning element; or one side of the stator which faces the controller cover is provided with a first positioning element, and the controller cover is provided with a second positioning element that comes into engagement with the first positioning element.

In one embodiment, the third mounting part is the first positioning element, and the first mounting part is the second positioning element;

where the first positioning element is provided with a first connecting hole, the second positioning element is provided with a second connecting hole, and the first fixing member is arranged to pass through the first connecting hole and the second connecting hole.

In one embodiment, the controller is configured to be snap-fitted into the controller cover or the first end cover; or alternatively the controller is fixed with the controller cover or the first end cover through a second fixing member.

In one embodiment, the first end cover is molded through a stretching molding process, a casting molding process, or an injection molding process.

In one embodiment, the first end cover is a housing made of metal or a housing made of resin.

In one embodiment, the electromotor further includes a rotor configured to rotate relative to the stator, where the rotor includes a rotating shaft and two bearings arranged at two ends of the rotating shaft respectively, the first end cover and the second end cover protrude outwards to form two annular bosses, interiors of the two annular bosses are provided with two bearing bores for accommodating the two bearings, where a bottom of at least one of the two annular bosses is provided with a groove structure or a convex structure.

In one embodiment, the first end cover and/or the second end cover is provided with at least one edge flanging which comes into contact with the stator tightly.

In one embodiment, the groove structure is an annular groove or the groove structure includes a plurality of separately arranged concave ribs that are enclosed to be ring-shaped; the convex structure is an annular boss or the convex structure includes a plurality of separately arranged convex ribs that are enclosed to be ring-shaped.

In the second aspect, a laundry machine is provided, the laundry machine includes the aforesaid electromotor and a water container configured to be secured with the second mounting part of the second controller cover.

The electromotor disclosed in the embodiments of the present disclosure has the beneficial effects as follows: the electromotor of the present disclosure includes the first end cover, the second end cover, the controller and the controller cover, the controller is arranged on the controller cover, the controller cover is fixed through an engagement between the first mounting part arranged on the controller cover and the third mounting part arranged on the first end cover or the stator, so that the controller cover can be fixed on the housing or the stator; furthermore, the controller cover is secured with the water container of the laundry machine through the second mounting part arranged on the controller cover, in this way, it only needs to arrange the third mounting part secured with the controller cover on the housing of the electromotor, or there is no need to arrange the third mounting part on the housing of the electromotor, instead, the third mounting part is directly arranged on the stator, such that the third mounting part can be fixedly assembled with the controller cover which has the controller arranged inside it, without the need of additionally arranging another mounting structure secured with the water container of the laundry machine on the first end cover, thereby effectively simplifying the structure of the first end cover, and reducing the cost of the laundry machine.

The laundry machine disclosed in the embodiments of the present disclosure has the beneficial effects listed below: the electromotor is applied in the laundry machine of the present disclosure, the housing of the electromotor only needs to be provided with the third mounting part secured with the controller cover, or there is no need to arrange the third mounting part on the housing of the electromotor, instead, the third mounting part is directly arranged on the stator, such that the third mounting part can be fixedly assembled with the controller cover which has the controller inside it, without the need of additionally arranging another mounting structure secured with the water container of the laundry machine on the first end cover, thereby effectively simplifying the structure of the first end cover, and reducing the cost of the laundry machine.

BRIEF DESCRIPTION OF THE DRAWINGS

In order to describe the technical solutions of the embodiments of the present disclosure more clearly, a brief introduction regarding the accompanying drawings that need to be used for describing the embodiments of the present disclosure or the prior art is given below; it is obvious that the accompanying drawings described below are merely some embodiments of the present disclosure, a person of ordinary skill in the art may also acquire other drawings according to the current drawings without paying creative labor.

Figure 1:
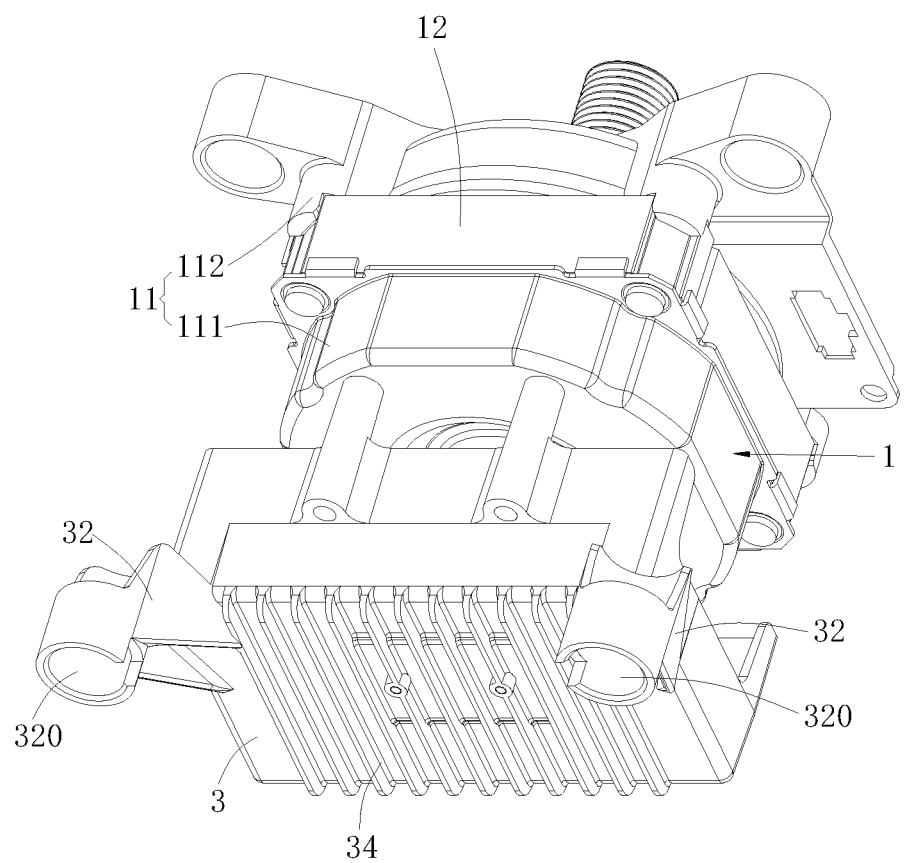
FIG. 1 illustrates a three-dimensional structural diagram of a first electromotor according to one embodiment of the present disclosure.

Reference numerals in the figures are listed below:

1-electromotor; 11-housing; 1111-first mounting part; 1112-second connecting hole; 1113-positioning groove; 1114-annular boss; 1115-edge flanging; 1116-bearing bore; 1117-annular groove; 112-second end cover; 12-stator; 13-rotor; 131-rotating shaft; 132-bearing; 2-controller; 3-controller cover; 31-first mounting part; 311-positioning aperture; 312-first connecting hole; 32-mounting foot; 320-second mounting part; 33-positioning pole; 34-heat dissipation fins; 4-water container.

DETAILED DESCRIPTION OF EMBODIMENTS

In order to make the purpose, the technical solution and the advantages of the present disclosure be clearer and more understandable, the present disclosure will be further described in detail below with reference to accompanying figures and embodiments. It should be understood that the embodiments described in detail herein are merely intended to illustrate but not to limit the present disclosure.

It needs to be noted that, when one component is described to be "fixed to" or "arranged on" another component, this component may be directly or indirectly arranged on another component. When it is described that one component "is connected with" another component, this component may be directly or indirectly connected to the another component. Orientation or position relationships indicated by terms including "upper", "lower", "left" and "right" are based on the orientation or position relationships shown in the accompanying figures and is only used for the convenience of description, instead of indicating or implying that the indicated device or element must have a specific orientation and is constructed and operated in a particular orientation, and thus should not be interpreted as limitation to the present disclosure. As for the person of ordinary skill in the art, the specific meanings of the terms may be interpreted according to specific conditions. Terms such as "the first" and "the second" are only for the purpose of conveniently describing and should not be interpreted as indicating or implying relative importance or implicitly indicating the number of indicated technical features. "Multiple/a plurality of" means two or more unless there is an additional explicit and specific limitation.

In order to describe the technical solutions disclosed in the present disclosure, the technical solutions are described in detail with reference to the accompanying figures and the embodiments.

Figure 2:
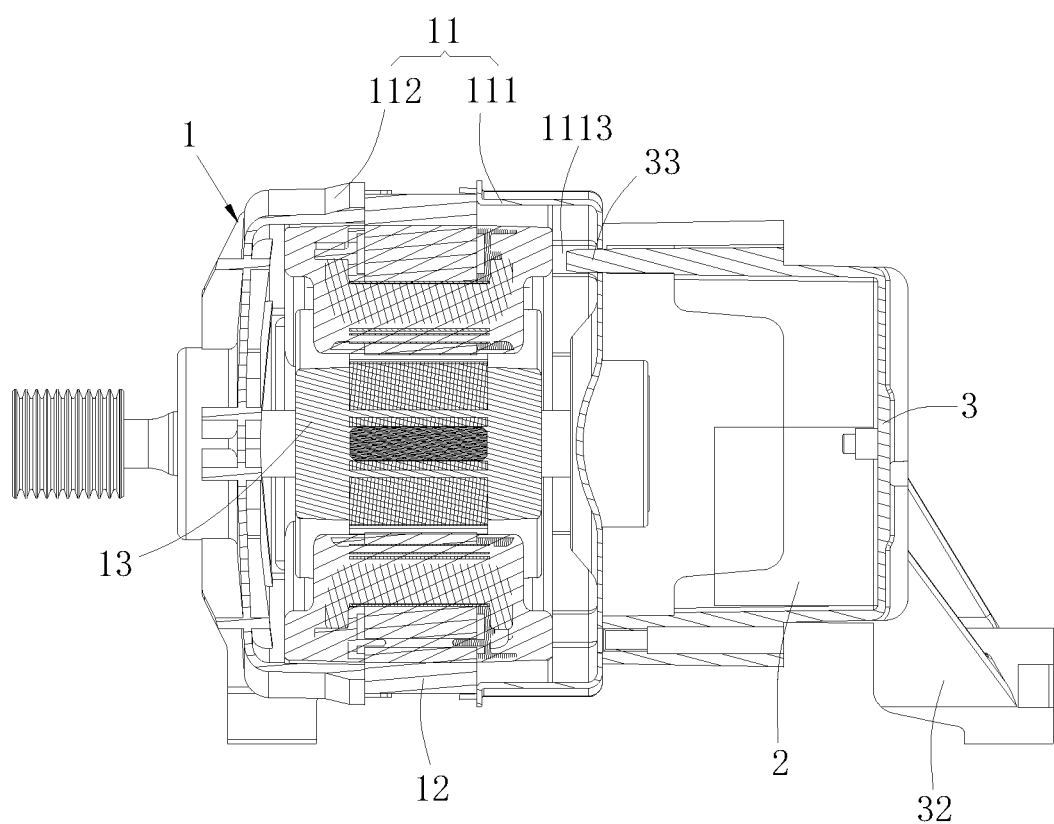
FIG. 2 illustrates a cross-sectional diagram of the first electromotor according to one embodiment of the present disclosure.
Figure 3:
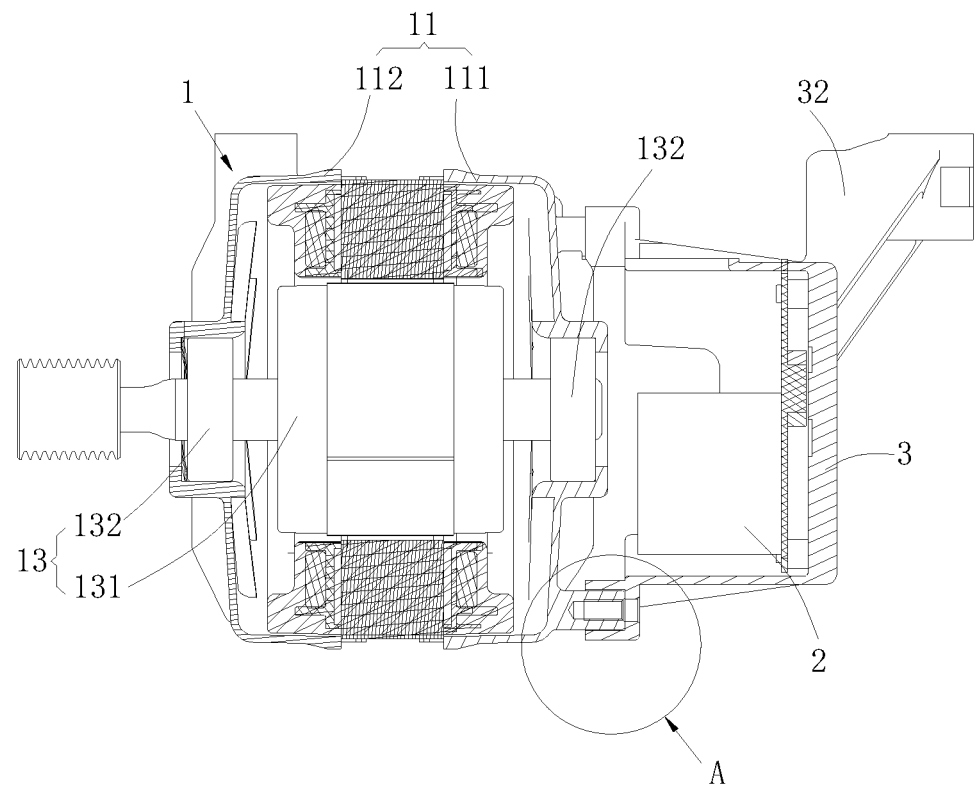
FIG. 3 illustrates a cross-sectional diagram of a second electromotor according to one embodiment of the present disclosure.

Referring to FIG. 1 and FIG. 2, in one embodiment of the electromotor, the electromotor 1 includes a housing 11, a controller 2 and a controller cover 3. The controller 2 may be configured to control the rotor 13 and other electronically controlled devices of the laundry machine. The controller 2 is arranged inside or outside of the controller cover 3, and the controller cover 3 is fixed on the housing 11 of the electromotor 1 or a stator 12 of the electromotor 1. The housing 11 includes a first end cover 111 and a second end cover 112. The first end cover 111 and the second end cover 112 are fixed on two opposite sides of the stator 12, respectively. The controller cover 3 is provided with a first mounting part 31 and a second mounting part 320, the first end cover 111 or the stator 12 is provided with a third mounting part 1111, the first mounting part 31 and the third mounting part 1111 are arranged to be engaged with each other, so that the controller cover 3 can be fixed on the first end cover 111 or the stator 12, and the controller 2 can be integrated in the electromotor 1. The second mounting part 320 is configured to be connected with a water container 4 of the laundry machine, so that a structure which is originally arranged on the housing 11 of the electromotor 1 is redesigned to be arranged on the controller cover 3, thereby simplifying the structure of the housing 11 of the electromotor 1. Since the housing 11 of the electromotor 1 needs to support the rotor 13, if the structure of the housing 11 of the electromotor 1 is overly complex, the difficulty level of manufacturing the laundry machine may be increased in order to ensure the strength of the housing 11 of the electromotor 1. Thus, the material and the production process of the housing 11 of the electromotor 1 are greatly limited. The housing 11 of the electromotor 1 in this embodiment is only provided with a third mounting part 1111, or the third mounting part 1111 does not need to be provided, and the third mounting part 1111 is directly disposed on the stator 12, so that the complexity of the structure of the first end cover 111 is greatly reduced, the scope of selections of the material and the production process of the first end cover 111 are broadened, and the production cost of the electromotor 1 is effectively reduced. In particular, with reference to FIG. 2 and FIG. 3, the first end cover 111 in FIG. 2 is manufactured and molded by using a stretching process, and the first end cover 111 in FIG. 3 is manufactured and molded by using a casting process; since the first end cover 111 has a simple structure, the first end cover 111 can be manufactured and molded by using different processes according to the requirement, and the requirement on the manufacturing process of the first end cover 111 can be lowered. When the first end cover 111 is made of a material such as resin, the first end cover 111 may be molded through an injection molding. The first end cover 111 may be a metal housing or a resin housing. The first end cover 111 is simple in structure and has low performance requirement on the material, so that the production cost of the first end cover 111 can be greatly reduced. Moreover, the controller cover 3 is only used to accommodate and protect the controller 2, and the requirements of the control cover 3 on the production process and the material is low. Thus, arranging the second mounting part 320 on the controller cover 3 will not significantly increase the production difficulty and the cost.

The electromotor in the aforesaid embodiment includes the housing 11, the controller 2, and the controller cover 3. The controller 2 is arranged on the controller cover 3, the housing 11 includes the first end cover 111 and the second end cover 112; the controller cover 3 is fixed through an engagement between the first mounting part 31 arranged on the controller cover 3 and the third mounting part 1111 arranged on the first end cover 111 or the stator 12; furthermore, the controller cover 3 is secured with the water container 4 of the laundry machine by arranging the second mounting part 320 on the controller cover 3. In this way, the housing 11 of the electromotor 1 only needs to be provided with the third mounting part 1111 secured with the controller cover 3. Alternatively, there is no need to arrange the third mounting part on the housing of the electromotor 1111; instead, the third mounting part 1111 is directly arranged on the stator 12 to be secured with the controller cover 3 which has the controller 2 arranged inside it, without the need of additionally arranging another mounting structure secured with the water container 4 of the laundry machine, so that the structure of the first end cover 111 is simplified, other materials with lower price and simpler production process may be selected and used for the first end cover 111, and the cost of the laundry machine is reduced accordingly.

Referring to FIG. 2 and FIG. 3, in one embodiment of the present disclosure, the second mounting part 320 is arranged on one side of the controller cover 3 opposite to the controller 2. The controller cover 3 is provided with a cavity, the controller 2 is arranged in the cavity, and the controller cover 3 is arranged to cover the outside of the first end cover 111. In other words, a side of the controller cover 3 opposite to the controller 2 is the outer side of the controller cover 3, that is, the second mounting part 320 is arranged on the outer side of the controller cover 3, the first mounting part 31 and the second mounting part 320 are arranged on one side of the controller cover 3 facing the housing 11 and one side of the controller cover 3 opposite to the housing 11, respectively. In this way, when the controller cover 3 is connected with the water container 4, the housing 11 does not interfere with the water container 4.

Figure 5:
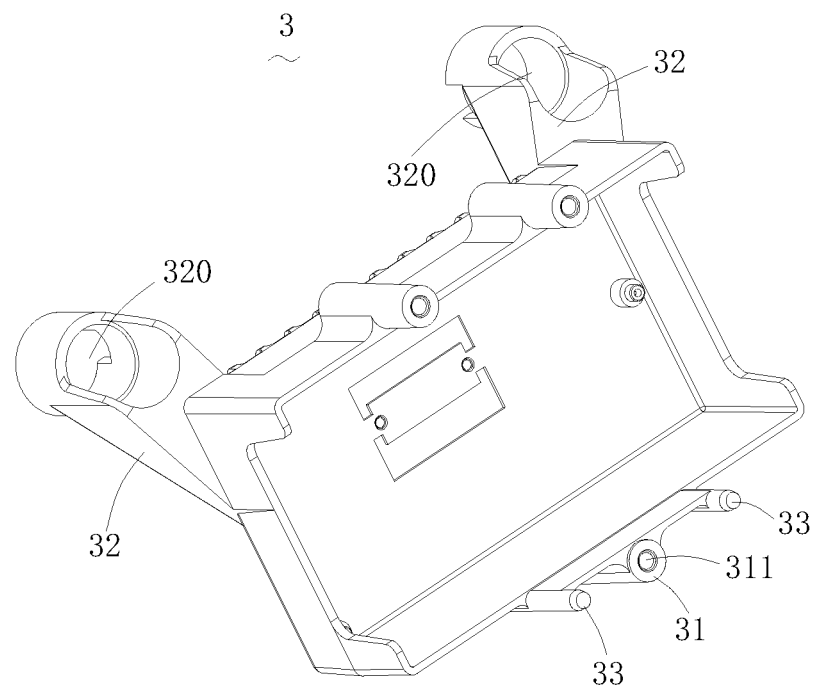
FIG. 5 illustrates a three-dimensional structural diagram of a controller cover according to one embodiment of the present disclosure.

Referring to FIG. 5, in one embodiment of the present disclosure, the surface of the controller cover 3 extends outwards to form a plurality of mounting feet 32, the second mounting part 320 is disposed on the mounting feet 32, the mounting feet 32 are arranged such that the second mounting part 320 may not be limited by the structure of the controller cover 3, the position of the second mounting part 320 is designed according to the structure of the water container 4. There may be a plurality of mounting feet 32, and each of the mounting feet 32 is provided with at least one second mounting part 320, such that the controller cover 3 can be stably fixed on the water container 4. For example, there are two mounting feet 32, the two mounting feet 32 extend outwards from the surface of the controller cover 3, and the two mounting feet 32 are arranged to be splayed.

In one embodiment, the second mounting part 320 is a mounting hole or a mounting column. When the second mounting part 320 is a mounting hole, the water container 4 is provided with a mounting column, the mounting column is arranged to be inserted into the mounting hole, and the second mounting part 320 is fixed on the water container 4 through a fastener such as screw and a pin. Alternatively, when the second mounting part 320 is a mounting column, the water container 4 is provided with a mounting hole, and the mounting column is arranged to be inserted into the mounting hole. When the mounting column is inserted into the mounting hole, a cushioning element such as a gasket is arranged between the mounting hole and the mounting column, so that a vibration effect of the electromotor 1 on the water container 4 can be reduced.

Referring to FIG. 1, in one embodiment of the present disclosure, the surface of the controller cover 3 is provided with heat dissipation fins 34 that greatly increase the surface area of the controller cover 3, so that heat generated by the controller 2 can be rapidly dissipated through the heat dissipation fins 34, thereby accelerating the heat dissipation rate of the controller 2. In one embodiment, the controller cover 3 is a metal cover, such as, an aluminum cover or an aluminum alloy cover. The metal cover has a better heat dissipation performance. Moreover, the aluminum, the aluminum alloy and other materials are prone to be molded and machined, and thus are suitable to be used for manufacturing complex structures, such as the second mounting part 320, without greatly increasing the production cost. In one embodiment, the controller cover 3 may also be a resin cover, when the controller cover 3 is the resin cover, heat dissipation fins may be disposed on the controller cover 3. The positions and the number of the heat dissipation fins are not limited herein.

In any one of the embodiments described above, the controller 2 is fixedly arranged inside the controller cover 3 by using a fastening method such as a snap-fit manner or a fastener; as an alternative, the controller 2 is fixed on the housing 11 using a fastening method such as a fastener; as yet another alternative, the controller 2 is received in the controller cover 3, and the controller cover 3 is fixed on the housing 11, so that the controller 2 is pressed tightly between the controller cover 3 and the housing 11.

In one embodiment of the present disclosure, the first mounting part 31 and the third mounting part 1111 are fixedly connected through a fixing member, so that the controller cover 3 is fixed on the first end cover 111 or the stator 12. The fixing member is arranged to pass through the first mounting part 31 and the third mounting part 1111, the fixing member may be selected as a screw or a pin, the controller cover 3 and the first end cover 111 or the stator 12 are fixed with each other by using the fixing member to pass through the first mounting part 31 and the third mounting part 1111.

In one embodiment, referring to FIG. 2 and FIG. 5, one side of the first end cover 111 or the stator 12 that faces the controller cover 3 is provided with a positioning groove 1113, the controller cover 3 is provided with a positioning column 33 correspondingly, and the positioning column 33 is arranged to be inserted into the positioning groove 1113 to facilitate the process of assembling and fixing the first end cover 111 or the stator 12 with the controller cover 3. Alternatively, one side of the first end cover 111 or the stator 12 that faces the controller cover 3 is provided with a positioning column, the controller cover 3 is provided with a positioning groove, and the positioning column is arranged to be inserted into the positioning groove to facilitate the process of assembling and fixing the first end cover 111 or the stator 12 with the controller cover 3. In the two embodiments described above, not only a mounting structure (i.e., the first mounting part 31 and the third mounting part 1111) is arranged between the first end cover 111 or the stator 12 and the controller cover 3, an alignment structure (i.e., the positioning column 33 and the positioning groove 1113) is also arranged between the first end cover 111 or the stator 12 and the controller cover 3, so that the first end cover 111 or the stator 12 and the controller cover 3 can be accurately assembled and secured stably.

Figure 4:
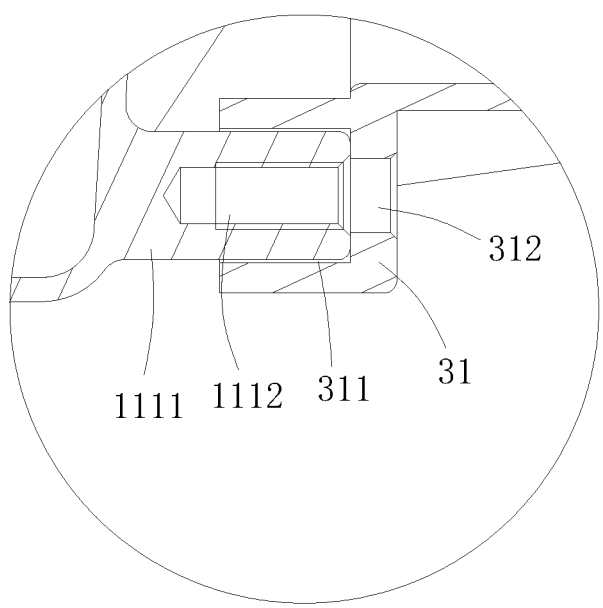
FIG. 4 illustrates an enlarged partial view of a part A shown in FIG. 3.

In one embodiment, referring to FIG. 3 and FIG. 4, the third mounting part 1111 is a positioning pole, the first mounting part 31 is provided with a positioning aperture 311, and the positioning pole is inserted into the positioning aperture 311 to fix the third mounting part 1111 with the first mounting part 31. As an alternative, the first mounting part 31 is the positioning pole, the third mounting part 1111 is provided with the positioning aperture, and the positioning pole is inserted into the positioning aperture to fix the third mounting part 1111 with the first mounting part 31. In one exemplary embodiment, a bottom of the positioning aperture 311 is provided with a first connecting hole 312, the positioning pole is provided with a second connecting hole 1112, and the fixing member passes through the first connecting hole 312 and the second connecting hole 1112 to fix the first mounting part 31 with the third mounting part 1111. The first connecting hole 312 and the second connecting hole 1112 may be unthreaded holes or threaded holes. When the first connecting hole 312 and the second connecting hole 1112 are unthreaded holes, the fixing member may be selected as a connection piece such as a pin; when one of the first connecting hole 312 and the second connecting hole 1112 is a threaded hole, and the other of the first connecting hole 312 and the second connecting hole 1112 is an unthreaded hole, the fixing member may be selected as a connection member such as a screw, and the screw passes through the optical hole to be connected to the threaded hole so as to secure the first mounting part 31 with the third mounting part 1111. In this embodiment, both the mounting structure and the positioning structure between the first end cover 111/the stator 12 and the controller cover 3 are arranged on the first mounting part 31 and the third mounting part 1111, that is, it only needs to arrange the third mounting part 1111 on the first end cover 111 to simplify the structure of the first end cover 111 to the most extent.

In one embodiment, when the first end cover 111 is a stretched end cover, the third mounting part 1111 is the second connecting hole 1112, the first mounting part 31 is the positioning column correspondingly, and the positioning column is provided with the first connecting hole 312. When the first end cover 111 is an aluminum casting end cover, the third mounting part 1111 is a positioning column which is provided with the second connecting hole 1112, and the first mounting part 31 is the first connecting hole 312 correspondingly.

Figure 6:
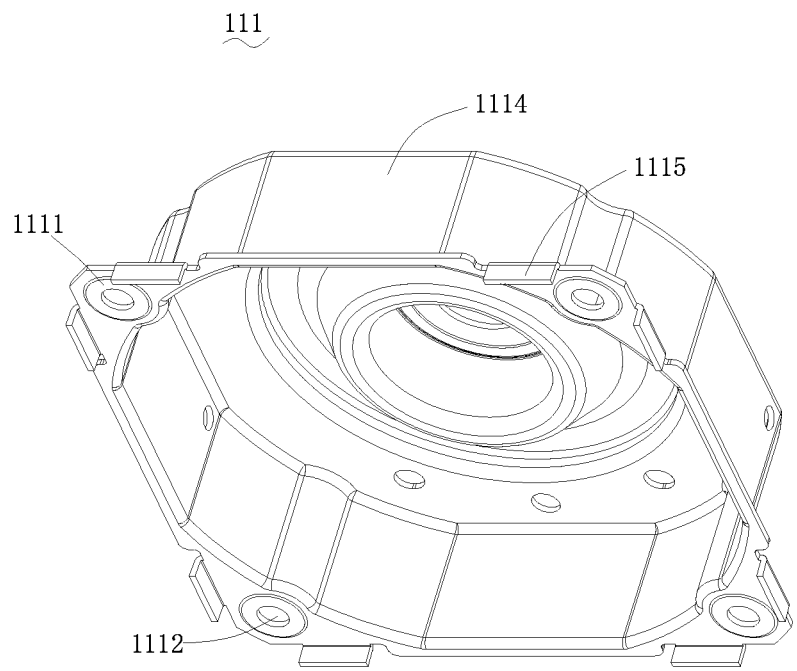
FIG. 6 illustrates a three-dimensional structural diagram of a second end cover according to one embodiment of the present disclosure.

In one embodiment, referring to FIG. 6, at least one of the first end cover 111 and the second end cover 112 is provided with an edge flanging 1115. Due to the fact that both the first end cover 111 and the second end cover 112 are fixed on the stator 12, there is a gap between the first end cover 111 and the stator 12 and between the second end cover 112 and the stator 12, thereby forming an air gap. If the air gap is overly large, a reluctance of the electromotor 1 is increased, and an efficiency of the electromotor 1 is reduced. The edge flanging 1115 is formed by folding the edge of the first end cover 111 and/or the second end cover 112, and the edge flanging 1115 comes into contact with the surface of the stator 12 tightly, so that the air gap between the first end cover 111 and/or the second end cover 112 and the stator 12 can be reduced, and the efficiency of the electromotor 1 is ensured. The number and the distribution of the edge flanging 1115 are not limited herein, the edge flanging 1115 may be uniformly arranged on the first end cover 111 and/or the second end cover 112 circumferentially.

Figure 7:
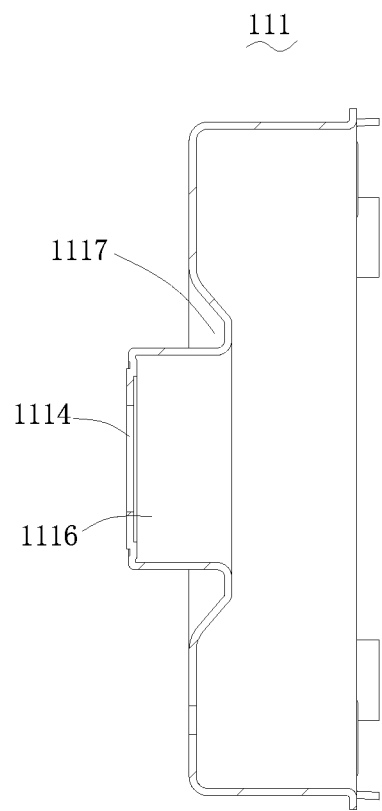
FIG. 7 illustrates a cross-sectional diagram of the second end cover according to one embodiment of the present disclosure.

In one embodiment, referring to FIG. 2, FIG. 3 and FIG. 7, the electromotor 1 includes a housing 11, a stator 12, and a rotor 13. The stator 12 is immobilized and stationary, the rotor 13 rotates relative to the stator 12, and the housing 11 is configured to support the rotor 13 and have a certain protection effect on the rotor 13 and the stator 12. The rotor 13 includes a rotating shaft 131 and two bearings 132 distributed on two ends of the rotating shaft 131 for supporting the rotating shaft 131, so that the rotating shaft 131 can rotate relative to the stator 12. The first end cover 111 and the second end cover 112 are provided with two annular bosses 1114, the annular bosses 1114 are arranged to protrude outwards from the interior of the electromotor 1, and interiors of the annular bosses 1114 are provided with two bearing bores 1116, and the two bearings 132 are respectively arranged in the two bearing bores 1116 of the first end cover 111 and the second end cover 112. A bottom of at least one of the annular bosses 1114 of the first end cover 111 and the second end cover 112 is provided with a groove structure or a convex structure for enhancing the structural strength of the first end cover 111 and the second end cover 112. The groove structure may be an annular groove 1117, an annular concave rib, etc. The annular groove 1117 and the annular concave rib may be arranged segmentally, or may be arranged to be ring-shaped as a whole. The convex structure may be a boss, a convex rib and the like. The bottom of the annular boss 1114 is a component close to the stator 12, and the annular groove 1117 is recessed towards the interior of the bearing bore 1116, and the arrangement of the annular groove 1117 may increase the strength of the annular boss 1114, and prevent the annular boss 1114 from being damaged or cracked when the bottom of the annular boss 1114 is subjected to a great pressure.

The electromotor 1 disclosed in the present disclosure may also be used in a commonly used household appliance, such as, a laundry machine, a dish-washing machine and the like, and an application scenario of the electromotor 1 is not limited thereto.

The present disclosure further provides a laundry machine. The laundry machine includes the electromotor 1 according to any embodiment described above. The electromotor 1 is used in the laundry machine of the present disclosure. The controller cover 3 is fixed according to the first mounting part 31 disposed thereon and the third mounting part 1111 which is arranged on the housing 11 and matches with the first mounting part 31. Furthermore, by providing the second mounting part 320 on the controller cover 3, such that the controller cover 3 is secured with the water container 4 of the laundry machine. In this way, the housing 11 of the electromotor 1 only needs to be provided with the third mounting part 1111 secured with the controller cover 3, so that the electromotor 1 can be secured with the controller cover 3 which has the controller 2 inside it, and there is no need to additionally provide other mounting structures fixedly connected with the water container 4 of the laundry machine. As a result, the structure of the housing 11 of the electromotor 1 is simplified and other suitable materials with lower price and simpler production process can be selected for the housing 11 of the electromotor 1, thereby reducing the cost of the laundry machine.

Figure 8:
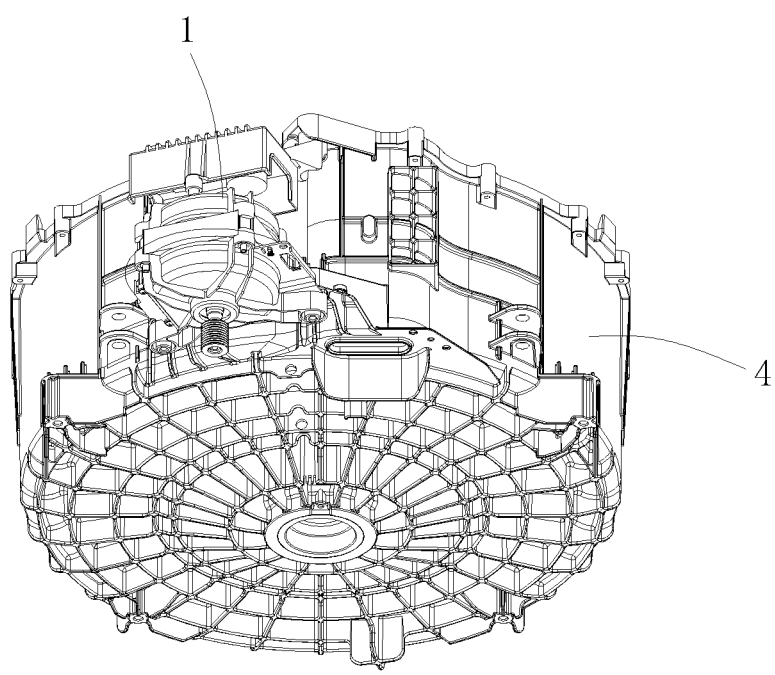
FIG. 8 illustrates a three-dimensional structural diagram of a part of the laundry machine according to one embodiment of the present disclosure.

In one embodiment, referring to FIG. 8, the laundry machine further includes a water container 4 and a rotating drum, the water container 4 is configured to contain water, and the rotating drum is rotatably mounted in the water container 4. A periphery of the water container 4 is provided with a fourth mounting part configured to be fixedly connected with the second mounting part 320. The second mounting part 320 is a mounting hole, and the fourth mounting part is a mounting column; as an alternative, the second mounting part 320 is a mounting column, and the fourth mounting part is a mounting hole; the mounting column is configured to be inserted into the mounting hole. The second mounting part 320 and the fourth mounting part may be fixedly connected through fasteners such as screws, pins, etc.

Only some exemplary embodiments of the present disclosure are described above, and these exemplary embodiments are not intended to limit the present disclosure. It is obvious to the person of ordinary skill in the art that, various modifications and changes may be made in the present disclosure. Any modification, equivalent replacement, improvement, and the like, which are made within the spirit and the principle of the present disclosure, should all be included in the protection scope of the claims of the present disclosure.

What is claimed is:

1. An electromotor comprising:
   a controller and a controller cover, wherein the controller is arranged on the controller cover;
   a first end cover and a second end cover, wherein the second end over is secured to the first end cover;
   a stator, wherein the first end cover and the second end cover are fixed on two opposite sides of the stator respectively;
   wherein the controller cover comprises a first mounting part configured to be secured to the first end cover and a second mounting part configured to be secured to a water container of a laundry machine, and wherein the first end cover comprises a third mounting part configured to be secured to the first mounting part; or
   wherein the controller cover comprises the first mounting part configured to be secured to the stator and the second mounting part configured to be secured to the water container of the laundry machine, and wherein the stator comprises the third mounting part configured to be secured to the first mounting part.

2. The electromotor according to claim 1, wherein the second mounting part is arranged on one side of the controller cover opposite to the controller.

3. The electromotor according to claim 1, wherein:
   a surface of the controller cover protrudes outwards to form a mounting foot,
   the second mounting part is arranged on the mounting foot, and
   the second mounting part is a mounting hole or a mounting column.

4. The electromotor according to claim 1, wherein a surface of the controller cover is provided with heat dissipation fins.

5. The electromotor according to claim 4, wherein the controller cover is selected from a group consisting of an aluminum cover, a cover made of aluminum alloy and a resin cover.

6. The electromotor according to claim 1, wherein the first mounting part and the third mounting part are connected by a first fixing member, and wherein the first fixing member is configured to pass through the first mounting part and the third mounting part.

7. The electromotor according to claim 6, wherein:
   one side of the first end cover which faces the controller cover is provided with a first positioning element, and the controller cover is provided with a second positioning element that comes into engagement with the first positioning element; or
   one side of the stator which faces the controller cover is provided with a first positioning element, and the controller cover is provided with a second positioning element that comes into engagement with the first positioning element.

8. The electromotor according to claim 7, wherein the third mounting part is the first positioning element, and the first mounting part is the second positioning element;
   wherein the first positioning element is provided with a first connecting hole, the second positioning element is provided with a second connecting hole, and the first fixing member is configured to pass through the first connecting hole and the second connecting hole.

9. The electromotor according to claim 1, wherein:
the controller is configured to be snap-fitted into the controller cover or the first end cover; or
the controller is fixed with the controller cover or the first end cover through a second fixing member.

10. The electromotor according to claim 1, wherein the first end cover is molded through a stretching molding process, a casting molding process, or an injection molding process.

11. The electromotor according to claim 1, wherein the first end cover is a housing made of metal or a housing made of resin.

12. The electromotor according to claim 1, further comprising a rotor configured to rotate relative to the stator,
wherein the rotor comprises a rotating shaft and two bearings arranged at two ends of the rotating shaft respectively, the first end cover and the second end cover protrude outwards to form two annular bosses, interiors of the two annular bosses are provided with two bearing bores for accommodating the two bearings, and a bottom of at least one of the two annular bosses is provided with a groove structure or a convex structure.

13. The electromotor according to claim 12, wherein the first end cover and the second end cover are provided with at least one edge flanging configured to come into contact with the stator tightly.

14. The electromotor according to claim 12, wherein:
the groove structure is an annular groove or the groove structure comprises a plurality of separately arranged concave ribs that are enclosed to be ring-shaped; and
the convex structure is an annular boss or the convex structure comprises a plurality of separately arranged convex ribs that are enclosed to be ring-shaped.

15. A laundry machine comprising:
the electromotor according to claim 1, and
a water container configured to be secured to the second mounting part of the second controller cover.

* * * * *